United States Patent
Lu et al.

(10) Patent No.: US 11,758,387 B2
(45) Date of Patent: Sep. 12, 2023

(54) INFORMATION TRANSMISSION METHOD AND DEVICE, AND COMPUTER STORAGE MEDIUM

(71) Applicant: GUANGDONG OPPO MOBILE TELECOMMUNICATIONS CORP., LTD., Dongguan (CN)

(72) Inventors: Qianxi Lu, Dongguan (CN); Ning Yang, Dongguan (CN); Huei-Ming Lin, Victoria (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/149,665

(22) Filed: Jan. 14, 2021

(65) Prior Publication Data
US 2021/0136567 A1 May 6, 2021

Related U.S. Application Data

(63) Continuation of application No. PCT/CN2019/096677, filed on Jul. 19, 2019.

(30) Foreign Application Priority Data

Jul. 19, 2018 (CN) .......................... 201810798927.2
Sep. 19, 2018 (CN) .......................... 201811095950.1

(Continued)

(51) Int. Cl.
*H04W 8/24* (2009.01)
*H04W 4/40* (2018.01)
*H04W 92/18* (2009.01)

(52) U.S. Cl.
CPC ................ *H04W 8/24* (2013.01); *H04W 4/40* (2018.02); *H04W 92/18* (2013.01)

(58) Field of Classification Search
CPC ......... H04W 8/24; H04W 4/40; H04W 92/18; H04W 38/00835
(Continued)

(56) References Cited

U.S. PATENT DOCUMENTS

2016/0044552 A1* 2/2016 Heo ...................... H04L 5/0032
370/331
2017/0288886 A1* 10/2017 Atarius .................. H04L 47/20
(Continued)

FOREIGN PATENT DOCUMENTS

CN 106559443 A 4/2017
CN 106998575 A 8/2017
(Continued)

OTHER PUBLICATIONS

Guangdong OPPO Mobile Telecommunications Corp. Ltd., Extended European Search Report, EP19837269.0, dated Jul. 26, 2021, 9 pgs.
(Continued)

*Primary Examiner* — Congvan Tran
(74) *Attorney, Agent, or Firm* — Morgan, Lewis & Bockius LLP

(57) ABSTRACT

An embodiment of the present application discloses a method and device for information transmission, and a computer storage medium. The method may include: sending a first message to a network device, wherein the first message includes communication capability information of the terminal on a PC5 interface.

18 Claims, 4 Drawing Sheets

---

Receiving a first message sent by a terminal, wherein the first message includes communication capability information of the terminal on a PC5 interface — S401

Sending a second message to the terminal, wherein the second message is configured to indicate a communication capability of the PC5 interface used by the terminal under control of the network device — S402

(30) Foreign Application Priority Data

Sep. 28, 2018 (CN) .......................... 201811140005.9
Oct. 25, 2018 (CN) .......................... 201811253229.0

(58) Field of Classification Search
USPC .......................................................... 370/310
See application file for complete search history.

(56) References Cited

U.S. PATENT DOCUMENTS

| | | | |
|---|---|---|---|
| 2018/0092027 A1 | 3/2018 | Sheng | |
| 2018/0167790 A1* | 6/2018 | Cavalcanti | H04W 4/44 |
| 2018/0184270 A1* | 6/2018 | Chun | H04W 4/40 |
| 2018/0199251 A1* | 7/2018 | Kim | H04W 36/08 |
| 2018/0206098 A1* | 7/2018 | Zarakas | H04L 63/08 |
| 2019/0014612 A1* | 1/2019 | Lee | H04W 76/38 |
| 2019/0239147 A1* | 8/2019 | Chun | H04W 88/04 |
| 2019/0281523 A1* | 9/2019 | Lee | H04W 36/30 |
| 2019/0387409 A1* | 12/2019 | Thangarasa | H04W 24/10 |
| 2019/0394625 A1* | 12/2019 | Kim | H04W 36/0022 |
| 2020/0170059 A1* | 5/2020 | Belleschi | H04W 72/1205 |
| 2020/0280827 A1* | 9/2020 | Fechtel | H04W 4/80 |

FOREIGN PATENT DOCUMENTS

| | | |
|---|---|---|
| CN | 107690832 A | 2/2018 |
| WO | WO2017/049975 A1 | 3/2017 |
| WO | WO2018064489 A1 | 4/2018 |
| WO | WO2020/015720 A1 | 1/2020 |

OTHER PUBLICATIONS

Lianghai Ji et al., Applying Multiradio Access Technologies for Reliability Enchancement in Vehicle-to-Everything Communication, IEEE*Acess*, vol. 6, Apr. 23, 2018, 16 pgs.

Examination Report, IN202117005195, dated Jan. 12, 2022, 6 pgs.

Guangdong OPPO Mobile Telecommunications Corp. Ltd., International Search Report and Written Opinion, PCT/CN2019/096677, dated Sep. 27, 2019, 14 pgs.

OPPO Guangdong Mobile Communications Co. Ltd., First Office Action, CN202110302448.9, dated Aug. 1, 2022, 14 pgs.

Guangdong OPPO Mobile Telecommunications Corp. Ltd., EP22207985, Extended European Search Report, dated Feb. 1, 2023, 9 pgs.

Guangdong OPPO Mobile Telecommunications Corp. Ltd., JP2021-502759, First Office Action, dated Jun. 6, 2023, 10 pgs.

3rd Generation Partnership Project; Technical Specification Group Services and System Aspects; Study on architecture enhancements for EPS and 5G System to support advanced V2X services (Release 16), 3GPP TR 23.786 V0.7.0 (Jul. 2018), 57 pgs.

Qualcomm Incorporated, "LTE/NR UE capability dependency and coordination", R2-1707835, 3GPP TSG-RAN WG2 Meeting #99, Berlin, Germany, Aug. 21-25, 2017, 45 pgs.

OPPO, "Discussion on Target Scenario for NR-V2X", R2-1813563, 3GPP TSG-RAN WG2 Meeting #103bis, Chengdu, China, Oct. 8-12, 2018, 3 pgs.

Samsung, "Solution for KI#2 / KI#12: PC5 resource control", S2-186933, SA WG2 Temporary Document, SA WG2 Meeting #128, Jul. 2-Jul. 6, 2018, Vilnius, Lithuania, 3 pgs.

\* cited by examiner

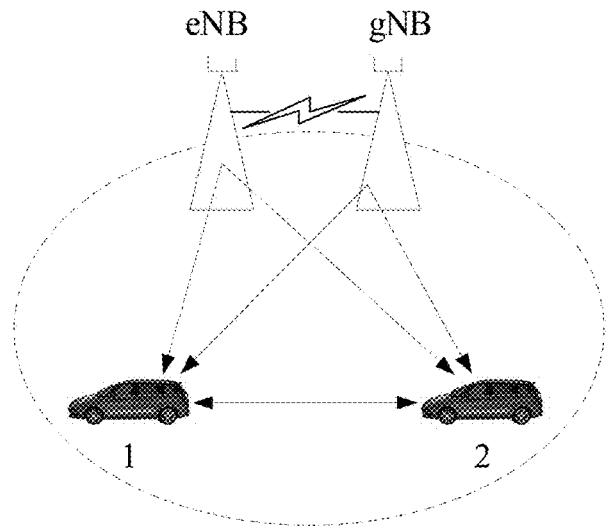
FIG.1
Sending a first message to a network device, wherein the first message includes communication capability information of the terminal on a PC5 interface —S201
FIG.2
First message
- First signaling
- Second signaling
- Third signaling
FIG.3
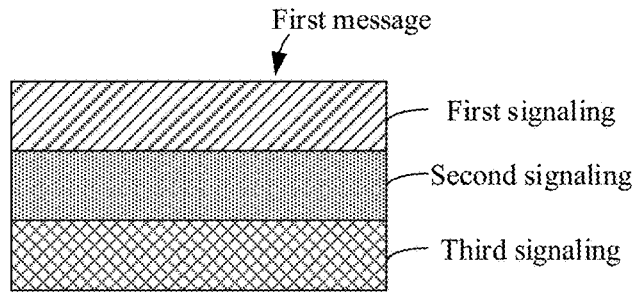
FIG.4

INFORMATION TRANSMISSION METHOD AND DEVICE, AND COMPUTER STORAGE MEDIUM

CROSS-REFERENCE TO RELATED APPLICATIONS

The present application is a continuation of International Application No. PCT/CN2019/096677, filed on Jul. 19, 2019, which claims priority to Chinese Patent Application No. 201810798927.2, filed with the State Intellectual Property Office of the People's Republic of China on Jul. 19, 2018; Chinese Patent Application No. 201811095950.1, filed with the State Intellectual Property Office of the People's Republic of China on Sep. 19, 2018; Chinese Patent Application No. 201811140005.9, filed with the State Intellectual Property Office of the People's Republic of China on Sep. 28, 2018; and Chinese Patent Application 201811253229.0, filed with the State Intellectual Property Office of the People's Republic of China on Oct. 25, 2018, all of which are incorporated herein by reference in their entirety.

TECHNICAL FIELD

The present application relates to the field of wireless communication technology, and more specifically, to a method and device for information transmission, and a computer storage medium.

BACKGROUND

A car networking system adopts a sidelink (SL) transmission technology based on a long term evolution (LTE)-device to device (D2D). Different from that communication data is received or sent via a base station in a traditional LET system, in the car networking system, terminals directly communicate with each other via a PC5 interface (an interface between the terminals), that is, the sidelink SL, which has a higher spectrum efficiency and lower transmission delay.

A vehicle-to-everything (V2X) technology was standardized in the 3rd generation partnership project (3GPP) Rel-14, in which single carrier transmission was mainly standardized. With the development of the 3GPP project, the standard version of the 3GPP protocol has also developed from Rel-14 to Rel-15, and then to Rel-16. Correspondingly, in the Rel-15 version, eV2x is extended to a multi-carrier scenario, that is, a UE may simultaneously perform transmitting and receiving over more than one carrier. In the Rel-16 version, the V2x scenario has been further extended to an inter-RAT system. Taking LTE and new radio (NR) systems as an example, an evolved NodeB (eNB) in LTE or a 5G base station gNB in the NR system both can control an LTE-based PC5 interface. In addition, the eNB in LTE or the 5G base station gNB in the NR system both can control an NR-based PC5 interface.

In such case, a communication capability of the terminal shall be coordinated in different scenarios of network deployment in consideration of the different scenarios of network deployment, such as whether there is a network coverage, a dual-connectivity (DC) relationship between different nodes provided by different or same operators, and the like.

SUMMARY

In a first aspect, an embodiment of the present application provides a method for information transmission, which is applied to a terminal. The method includes:

sending a first message to a network device, wherein the first message includes communication capability information of the terminal on a PC5 interface.

In a second aspect, an embodiment of the present application provides a method for information transmission, which is applied to a network device. The method includes:

receiving a first message sent by a terminal, wherein the first message includes communication capability information of the terminal on a PC5 interface; and sending a second message to the terminal, wherein the second message is configured to indicate a communication capability of the PC5 interface used by the terminal under control of the network device.

In a third aspect, an embodiment of the present application provides a method for information transmission. The method includes:

sending, by a first network device, a first message to a second network device, wherein the first message is configured to indicate communication capability information of a PC5 interface which can be used by a terminal.

In a fourth aspect, an embodiment of the present application provides a method for information transmission. The method includes:

receiving, by a second network device, a first message sent by a first network device, wherein the first message is configured to indicate communication capability information of a PC5 interface which can be used by a terminal.

In a fifth aspect, an embodiment of the present application provides a terminal. The terminal includes a first sending part, configured to send a first message to a network device, wherein the first message includes communication capability information of the terminal on a PC5 interface In a sixth aspect, an embodiment of the present application provides a network device. The network device includes a second receiving part and a second sending part, wherein the second receiving part is configured to receive a first message sent by a terminal, wherein the first message includes communication capability information of the terminal on a PC5 interface; and the second sending part is configured to send a second message to the terminal, wherein the second message is configured to indicate a communication capability of the PC5 interface used by the terminal under control of the network device.

In a seventh aspect, an embodiment of the present application provides a terminal. The terminal includes a first network interface, a first memory, and a first processor, wherein the first network interface is configured to send and receive a signal in an information receiving and sending process with other external network elements; the first memory is configured to store a computer program that can be run on the first processor; and the first processor is configured to execute the method according to the first aspect when running the computer program.

In an eighth aspect, an embodiment of the present application provides a network device. The network device includes a second network interface, a second memory, and a second processor, wherein the second network interface is configured to send and receive a signal in an information receiving and sending process with other external network elements;

the second memory is configured to store a computer program that can be run on the second processor; and the second processor is configured to execute the method according to the second aspect when running the computer program.

In a ninth aspect, an embodiment of the present application provides a computer storage medium, storing an program for information transmission that, when being executed by at least one processor, implements the method for information transmission according to the first aspect or the second aspect.

BRIEF DESCRIPTION OF THE DRAWINGS

FIG. 1 is a schematic diagram of an exemplary car networking system architecture provided by an embodiment of the present application;

FIG. 2 is a schematic flowchart of a method for information transmission provided by an embodiment of the present application;

FIG. 3 is a schematic diagram of signaling distinction of a first message provided by an embodiment of the present application;

FIG. 4 is a schematic flowchart of another method for information transmission provided by an embodiment of the present application;

DETAILED DESCRIPTION

Figure 5A:
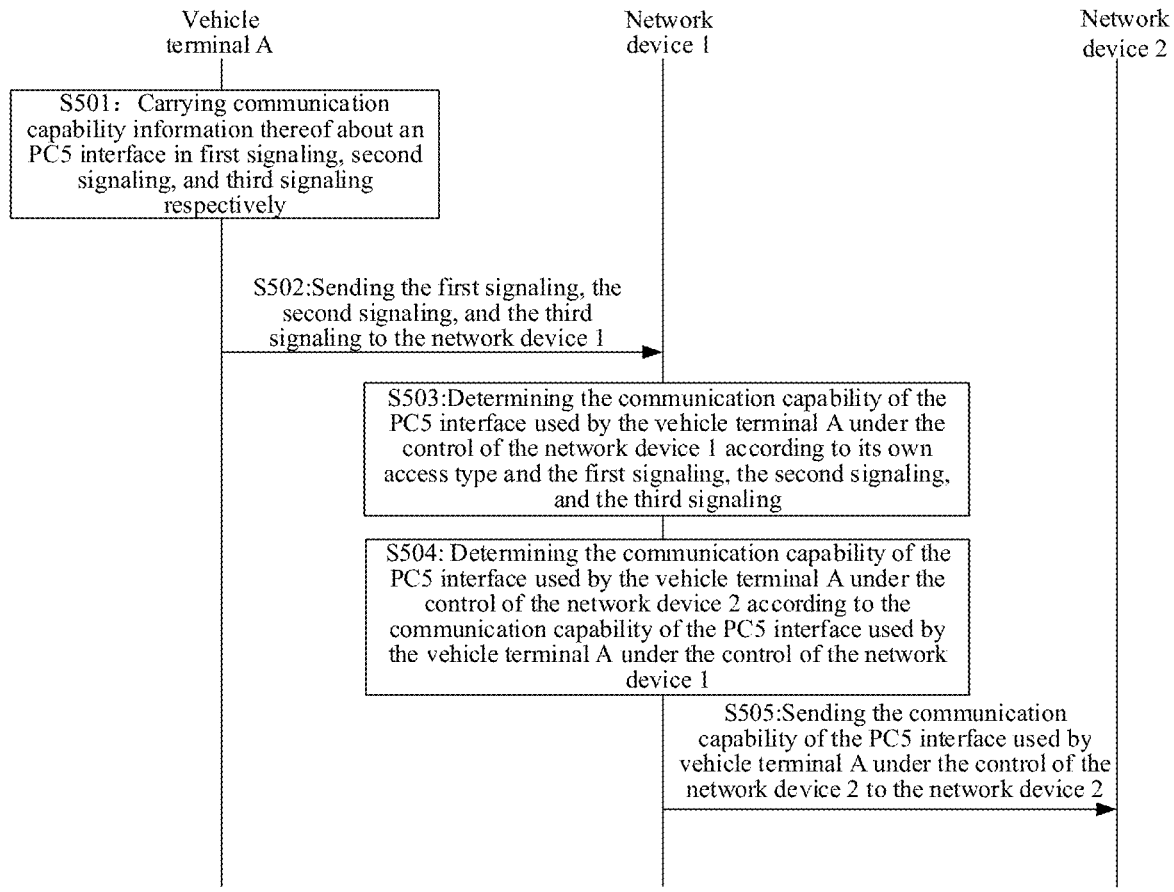
FIG. 5A is a schematic diagram of a specific implementation process of a method for information transmission provided by an embodiment of the present application.

The technical solution in embodiments of the present application will be clearly and completely described below in conjunction with the drawings in the embodiments of the present application.

FIG. 1 shows an exemplary car networking system architecture provided by an embodiment of the present application, and the architecture may be applied to the technical solution in the embodiments of the present application. The system architecture may be based on various communication systems, such as a car networking system based on LTE-D2D. Unlike a traditional LTE system in which communication data between terminals is received or sent through a network device (for example, a base station), the car networking system uses direct terminal-to-terminal communication, so it has a higher spectrum efficiency and lower transmission delay. In FIG. 1, by taking a vehicle terminal 1 as an example, a transmission resource of the vehicle terminal 1 is allocated by a base station, such as an evolved NodeB (eNB) in LTE and/or a 5G base station (gNB) in new radio (NR). Specifically, the base station described above sends a control message for indicating a grant resource to the vehicle terminal 1 through downlink (DL) shown by the dashed line; and then the vehicle terminal 1 transmits, over SL indicated by the solid arrow, data to a vehicle terminal 2 according to the resource allocated by the base station. It should be noted that data transmission between the eNB and the gNB may also be performed in a wired or wireless manner.

Optionally, the communication system on which the car networking system shown in FIG. 1 is based may be a global system of mobile communication (GSM) system, a code division multiple access (CDMA) system, a wideband code division multiple access (WCDMA) system, general packet radio service (GPRS), an LTE system, an LTE frequency division duplex (FDD) system, an LTE time division duplex (TDD), a universal mobile telecommunication system (UMTS), a worldwide interoperability for microwave access (WiMAX) communication system, a new radio (NR) or future 5G system, and the like.

In addition, the vehicle terminal in the embodiments of the present application may also be called a terminal, a terminal device, and the like, which refers to a vehicle terminal device, and may also be a terminal device in a future 5G network or a future evolved public land mobile communication network (PLMN), however the embodiments of the present application are not limited thereto.

The present application describes various embodiments in conjunction with a network device. The network device in the embodiments of the present application may be a device used to communicate with a terminal device. The network device may be a base transceiver station (BTS) in GSM or CDMA, a NodeB (NB) in a WCDMA system, an evolutional NodeB (eNB or eNodeB) in an LTE system, a wireless controller in a cloud radio access network (CRAN) scenario, a relay station, an access point, a vehicle device, a wearable device, a network device in the future 5G network, a network device in the future evolved PLMN network and the like, however the embodiments of the present application are not limited thereto.

In FIG. 1, since the vehicle terminal accesses two different types of base stations, i.e., eNB and gNB, the two base stations may control a PC5 interface of the vehicle terminal. It can be understood that the control refers to not only that an LTE-based PC5 interface of the vehicle terminal is controlled, but also that an NR-based PC5 interface of the vehicle terminal is controlled. In view of the above situation, it is necessary to coordinate a communication capability of the PC5 interface of the vehicle terminal for different scenarios of network deployment. The embodiments of the present application are illustrated and described by the following embodiments.

It may be understood that all the technical solutions in the embodiments of the present application may not only be applied to the car networking system, but also be applied to other terminal-to-terminal communication systems. The terminal in the embodiments of the present application may be a vehicle terminal, a handheld terminal, a personal digital assistant (PDA), a wearable terminal and the like, and the network in the embodiments of the present application may include an NR network, an LTE network and the like.

First Embodiment

FIG. 2 shows a method for information transmission provided by an embodiment of the present application. The method may be applied to a terminal in a D2D under an inter-RAT system, or even to a vehicle terminal in a V2X technology under the inter-RAT system. The method may include:

S201, sending a first message to a network device, wherein the first message includes communication capability information of the terminal on a PC5 interface.

In the technical solution shown in FIG. 2, after the terminal under the inter-RAT system reports the communication capability information about the PC5 interface to the network device through the first message, the network device may coordinate the communication capability of the PC5 interface of the terminal according to the communication capability information of the PC5 interface reported by the terminal, so that the communication capability of the PC5 interface of the terminal can be coordinated under the coverage with different types of networks.

In an embodiment of the present application, the communication capability information of the terminal on the PC5 interface includes: a combination of a communication capability of the PC5 interface supported by the terminal under control of a first network device and the communication capability of the PC5 interface supported by the terminal under control of a second network device, wherein the first network device and the second network device are coupled by a dual connectivity architecture.

In an implementation, the first network device and the second network device are synchronized with each other. In another implementation, the first network device and the second network device are not synchronized with each other.

In an implementation, access types of the first network device and the second network device are both LTE. In another implementation, access types of the first network device and the second network device are both NR. In yet another implementation, an access type of the first network device is LTE, and the access type of the second network device is NR.

In an embodiment of the present application, the communication capability information may be used to describe data transmission and communication capabilities of the PC5 interface, and the capability can be reflected or characterized by various parameter values, for example, the number of transmitting chains Tchains that the PC5 interface may provide and the number of receiving chains Rchains that the PC5 interface may provide. It may be understood that, other parameter values than the number of chains that may reflect or characterize the data transmission and communication capabilities of the PC5 interface may be regarded as the communication capability information described in the embodiments of the present application.

For the technical solution shown in FIG. 2, the communication capability information of the terminal on the PC5 interface included in the first message includes: first indication information for indicating an access type of the PC5 interface, and/or second indication information for indicating the access type of a Uu interface which can control the PC5 interface.

Specifically, the first indication information for indicating the access type of the PC5 interface may indicate the access type of the PC5 interface, for example, a PC5 interface LTE-PC5 with an LTE access type, or a PC5 interface NR-PC5 with an NR access type. By taking the network device being a base station such as eNB or gNB as an example, the Uu interface is usually used for data transmission between the terminal and the base station. Therefore, the access types of the Uu interface are different according to the different access types reflected by the base station. Accordingly, the second indication information for indicating the access type of the Uu interface which can control the PC5 interface may indicate the access type of the Uu interface which can control the PC5 interface, for example, a Uu interface LTE-Uu with the LTE access type or a Uu interface NR-Uu with the NR access type.

By taking the architecture shown in FIG. 1 as an example, the network device may include at least two access types of network devices, which may be referred to as a first network device and a second network device in the embodiment. Due to the different access types of the two network devices, the communication capability information of the terminal on the PC5 interface that they need to obtain is also correspondingly different. Then, for the first message described in S201, the communication capability information of the terminal on the PC5 interface included in the first message may be carried through different types of signaling. In the embodiment, referring to the communication capability information of the terminal on the PC5 interface included in the first message shown in FIG. 3 and by taking three types of signaling as an example, in the communication capability information of the terminal on the PC5 interface included in the first message:

representation of a communication capability of the PC5 interface for long term evolution LTE is carried in first signaling, as shown in the slash-filled box in FIG. 3;

representation of a communication capability of the PC5 interface for new radio NR is carried in second signaling, as shown in the dot-filled box in FIG. 3; and representation of a communication capability of the PC5 interface for an LTE and NR dual connectivity DC is carried in third signaling, as shown in the cross-line-filled box in FIG. 3.

In an embodiment of the present application, in the communication capability information of the terminal on the PC5 interface included in the first message, representation of a communication combination of the PC5 interface for an LTE and LTE dual connectivity is carried in first signaling.

In an embodiment of the present application, in the communication capability information of the terminal on the PC5 interface included in the first message, representation of a communication capability combination of the PC5 interface for an LTE and LTE dual connectivity is carried in third signaling.

In an embodiment of the present application, in the communication capability information of the terminal on the PC5 interface included in the first message, representation of a communication capability combination of the PC5 interface for an LTE and LTE dual connectivity is carried in fourth signaling.

In an embodiment of the present application, in the communication capability information of the terminal on the PC5 interface included in the first message, representation of a communication capability combination of the PC5 interface for an NR and NR dual connectivity is carried in second signaling.

In an embodiment of the present application, in the communication capability information of the terminal on the PC5 interface included in the first message, representation of a communication capability combination of the PC5 interface for an NR and NR dual connectivity is carried in third signaling.

In an embodiment of the present application, in the communication capability information of the terminal on the PC5 interface included in the first message, representation of a communication capability combination of the PC5 interface for an NR and NR dual connectivity is carried in fifth signaling.

It should be noted that the above several types of signaling may be specifically implemented through three different information elements (IEs) in an RRC message. In addition, other specific implementations that can implement the foregoing signaling may also be adaptively applied to the technical solution of the embodiments of the present application, and details thereof are not described herein again.

Among the above several types of signaling, since the first signaling is used to characterize the communication capability of the PC5 interface for LTE, what included in the first signaling is the communication capability information related to LTE, which may specifically include at least one or more of:

the communication capability information of the PC5 interface LTE-PC5 controlled by an LTE-Uu interface and with an access type of LTE;

the communication capability information of the PC5 interface LTE-PC5 controlled by an NR-Uu interface and with the access type of the LTE; and the communication capability information of the PC5 interface NR-PC5 controlled by the LTE-Uu interface and with the access type of NR.

Since the second signaling is used to characterize the communication capability of the PC5 interface for new radio NR, what included in the second signaling is the communication capability information related to NR, which may specifically include at least one or more of:

the communication capability information of the PC5 interface NR-PC5 controlled by an NR-Uu interface and with an access type of NR;

the communication capability information of the PC5 interface LTE-PC5 controlled by the NR-Uu interface and with the access type of LTE; and the communication capability information of the PC5 interface NR-PC5 controlled by an LTE-Uu interface and with the access type of the NR.

Since the third signaling is used to characterize the communication capability of the PC5 interface for an LTE and NR dual connectivity DC, what included in the third signaling is the communication capability information related to both the LTE and NR, which may specifically include a combination of the communication capability information of at least two of:

the communication capability information of an LTE-Uu interface;

the communication capability information of an NR-Uu interface;

the communication capability information of the PC5 interface NR-PC5 controlled by the NR-Uu interface and with an access type of NR;

the communication capability information of the PC5 interface LTE-PC5 controlled by the LTE-Uu interface and with the access type of LTE;

the communication capability information of the PC5 interface LTE-PC5 controlled by the NR-Uu interface and with the access type of the LTE; and the communication capability information of the PC5 interface NR-PC5 controlled by the LTE-Uu interface and with the access type of the NR.

Since the content that the third signaling may contain is also included in the first signaling or the second signaling, the third signaling may further include identification information for indicating the communication capability, and the identification information of the communication capability indicates the communication capability information defined in the first signaling and/or the second signaling. For example, it is assumed that the first signaling includes the communication capability information of the PC5 interface LTE-PC5 controlled by the LTE-Uu interface and with the access type of LTE and the identifier of the communication capability information is A, and the second signaling includes the communication capability information of the PC5 interface NR-PC5 controlled by the NR-Uu interface and with the access type of NR and the identifier of the communication capability information is B, if the third signaling also includes the communication capability information of the PC5 interface LTE-PC5 controlled by the LTE-Uu interface and with the access type of LTE and the communication capability information of the PC5 interface NR-PC5 controlled by the NR-Uu interface and with the access type of NR, the third signaling may only include the identifiers corresponding to the two pieces of communication capability information, i.e., A and B. Therefore, when an opposite end to the terminal receives the third signaling, it can still determine the respectively indicated communication capability information according to the two identifiers A and B.

Optionally, the third signaling further includes: identification information for indicating that the terminal device supports a dual connectivity architecture of LTE-Uu and NR-Uu synchronized with each other. Alternatively, the third signaling further includes: identification information for indicating that the terminal device supports a dual connectivity architecture of LTE-Uu and NR-Uu not synchronized with each other.

In an embodiment of the present application, a communication capability of the PC5 interface for an LTE and LTE dual connectivity includes: identification information for indicating that the terminal device supports a dual connectivity architecture of LTE-Uu and LTE-Uu synchronized with each other.

In an embodiment of the present application, a communication capability of the PC5 interface for an LTE and LTE dual connectivity includes: identification information for indicating that the terminal device supports a dual connectivity architecture of LTE-Uu and LTE-Uu not synchronized with each other.

In an embodiment of the present application, a communication capability of the PC5 interface for an NR and NR dual connectivity includes: identification information for indicating that the terminal device supports a dual connectivity architecture of NR-Uu and NR-Uu synchronized with each other.

In an embodiment of the present application, a communication capability of the PC5 interface for an NR and NR dual connectivity includes: identification information for indicating that the terminal device supports a dual connectivity architecture of NR-Uu and NR-Uu not synchronized with each other.

According to the foregoing content of the embodiment, after distinguishing the communication capability information of the terminal on the PC5 interface included in the first message through the above three types of signaling, the terminal reports the same to the network device. In detail, referring to the network architecture shown in FIG. 1, since the terminal is in the inter-RAT system and thus will access at least two network devices, the terminal needs to report the communication capability information about the PC5 interface to the at least two network devices through the first message. Preferably, for the above three types of signaling, the sending the first message to the network device includes:

sending the first signaling, the second signaling, and the third signaling to one target network device among at least two network devices.

It should be noted that in this preferred example, after the terminal sends the first signaling, the second signaling, and the third signaling to the target network device, the target network device may determine, according to the access type and requirement thereof, the communication capability of the PC5 interface used by the target network device itself; then determine, according to the communication capability of the PC5 interface used by the target network device itself, the communication capability of the PC5 interface used by other network devices than the target network device from the communication capability information included in the above three types of signaling, and send the same to the other network devices. This allows the other network devices to determine the communication capability of the PC5 interface used by themselves.

In addition, since the at least two network devices correspond to different access types, the embodiment takes two network devices as an example, and the two network devices are a first network device with the access type of LTE and a second device with the access type of NR respectively. Preferably, for the above three types of signaling, the sending the first message to the network device includes:

sending the first signaling to a first network device with an access type of LTE;

sending the second signaling to a second network device with the access type of NR; and sending the third signaling to the first network device or the second network device.

It should be noted that in this preferred example, since the three types of signaling correspond to different access conditions respectively, the terminal may correspondingly send these three types of signaling according to the access types corresponding to different network devices. Therefore, each network device may determine the communication capability of the PC5 interface used by each network device itself according to the requirement thereof.

In an embodiment of the present application, the sending the first message to the network device may be implemented in the following two ways:

1) sending a communication combination of the PC5 interface for an LTE and LTE dual connectivity to a first network device and/or a second network device, wherein the first network device and the second network device form an LTE and LTE dual connectivity architecture; and 2) sending a communication combination of the PC5 interface for an NR and NR dual connectivity to a first network device and/or a second network device, wherein the first network device and the second network device form an NR and NR dual connectivity architecture.

After the first message is sent to the network device according to the above two preferred examples, the method further includes: receiving a second message sent by the network device, wherein the second message is configured to indicate a communication capability of the PC5 interface used by the terminal under control of the network device.

Before the first message is sent to the network device according to the above two preferred examples, a third message sent by the network device is received, wherein the third message is configured to indicate a communication capability of the PC5 interface controlled by the network device. Further, the communication capability of the PC5 interface controlled by the network device includes a radio access type (RAT) of the PC5 interface controlled by the network device.

For the above third message, the terminal determines, according to the third message, whether to report the communication capability of the PC5 interface of at least one of:

the communication capability information of the PC5 interface LTE-PC5 controlled by an LTE-Uu interface and with an access type of LTE;

the communication capability information of the PC5 interface LTE-PC5 controlled by an NR-Uu interface and with the access type of the LTE;

the communication capability information of the PC5 interface NR-PC5 controlled by the LTE-Uu interface and with the access type of NR; and the communication capability information of the PC5 interface NR-PC5 controlled by the NR-Uu interface and with the access type of the NR.

Regarding the above second message, it should be noted that, since the network device learns the communication capability of the terminal on the PC5 interface by receiving the first message, after the network device determines the communication capability of the PC5 interface used by the terminal under the control of the network device based on the first message, the network device needs to provide feedback to the terminal, and the second message is a specific form of the feedback. Since the second message specifies the communication capability of the PC5 interface used by the terminal under the control of the network device, the terminal may determine, according to the communication capability of the PC5 interface used under the control of the network device, the communication capability of the PC5 interface reserved and used by the terminal itself, and accordingly, the method further includes:

determining the communication capability of the PC5 interface used by the terminal, according to the communication capability of the PC5 interface used by the terminal under the control of the network device indicated in the second message.

It may be understood that in addition to that the terminal determines the communication capability of the PC5 interface used by the terminal through the second message, the terminal may reserve in advance the communication capability of the PC5 interface used by itself, and accordingly, the method further includes: determining, by the terminal itself, the communication capability of the PC5 interface used by the terminal, before sending the first message to the network device.

Specifically, the communication capability information of the PC5 interface used by the terminal described above includes:

the communication capability information of the PC5 interface to be reported by the terminal to another network device than the network device; and/or the communication capability of the PC5 interface used by the terminal outside the control of the network device.

Specifically, the communication capability of the PC5 interface used by the terminal outside the control of the network device is the communication capability of the PC5 interface that is not included in the reported information.

It should be noted that when the terminal communicates with the network device, if the communication of the PC5 interface under the control of the network device conflicts with the communication of the PC5 interface used by the terminal outside the control of the network device, in a preferred embodiment, the communication of the PC5 interface under the control of the network device has a higher priority. Therefore, a communication priority of the PC5 interface under the control of the network device is higher than that of the PC5 interface used by the terminal outside the control of the network device.

In the technical solution of the embodiment, after a terminal reports communication capability information about a PC5 interface to a network device, the network device may determine a communication capability of the PC5 interface used by the terminal according to the first message, and thus when the terminal is in a coverage with different networks, it can coordinate the communication capability of the terminal PC5 interface.

Second Embodiment

Based on the same inventive concept of the foregoing embodiment, FIG. 4 shows a method for information transmission provided by an embodiment of the present application. The method may be applied to a D2D or V2X technology to achieve one of at least two network devices in an inter-RAT system, and the method may include:

S401, receiving a first message sent by a terminal, wherein the first message includes communication capability information of the terminal on a PC5 interface; and S402, sending a second message to the terminal, wherein the second message is configured to indicate a communication capability of the PC5 interface used by the terminal under control of the network device.

In the technical solution shown in FIG. 4, after the network device receives the first message, it determines the communication capability of the PC5 interface used by the terminal under control of the network device according to the communication capability information of the terminal on the PC5 interface included in the first message, and provides feedback to the terminal through the second message, so that the terminal may reserve the communication capability used by the terminal itself. For the process of reserving the communication capability used by the terminal itself, please refer to the foregoing embodiment, which will not be repeated herein. The method for information transmission described in the embodiment realizes the capability coordination of the PC5 interface.

In the technical solution shown in FIG. 4, the communication capability information of the terminal on the PC5 interface included in the first message may be carried through different types of signaling. Therefore, in a possible implementation, the first message may include first signaling, second signaling, and third signaling. By taking these three types of signaling as an example, in the communication capability information of the terminal on the PC5 interface included in the first message, representation of the communication capability of the PC5 interface for long term evolution LTE is carried in the first signaling, the representation of the communication capability of the PC5 interface for new radio NR is carried in the second signaling, and the representation of the communication capability of the PC5 interface for an LTE and NR dual connectivity DC is carried in the third signaling.

It should be noted that the above three types of signaling may be specifically implemented through three different IEs in an RRC message. In addition, other specific implementations that can implement the foregoing three types of signaling may also be adaptively applied to the technical solution of the embodiments of the present application, and details are not described herein again.

In addition, since the number of network devices that implement the inter-RAT system is at least two, the access type of the network device described in the embodiment may be LTE or NR. Therefore, for the technical solution shown in FIG. 4, in another possible implementation, for an access type of the network device being LTE: the first message includes first signaling and third signaling, wherein representation of the communication capability of the PC5 interface for long term evolution LTE is carried in the first signaling, and the representation of the communication capability of the PC5 interface for an LTE and NR dual connectivity DC is carried in the third signaling.

For an access type of the network device being NR: the first message includes second signaling and third signaling, wherein representation of the communication capability of the PC5 interface for new radio NR is carried in the second signaling, and the representation of the communication capability of the PC5 interface for an LTE and NR dual connectivity DC is carried in the third signaling.

As for the above two implementations, it should be noted that the network device described in the embodiment will receive the communication capability information of the PC5 interface related to other network devices than the network device, then the network device, after determining the communication capability of the PC5 interface required for control thereof, may further indicate the communication capability of the PC5 interface to other network devices. Therefore, based on the above two implementations, after receiving the first message sent by the terminal, the method further includes:

sending a first indication message to another network device than the network device, wherein the first indication message is configured to indicate the communication capability information of the PC5 interface which can be used by the terminal under control of the other network device. Further, the first indication message is configured to indicate, to the other network device, the communication capability information of the PC5 interface which can be used by the terminal under control of the other network device, in a case where the network device and the other network device are coupled in a dual connectivity DC architecture.

For example, assuming that the network device described in the embodiment is NE1 and the access type thereof is LTE, when the first message received by NE1 includes first signaling, second signaling, and third signaling, NE1 may receive the communication capability of the PC5 interface that can be used by other network devices than NE1, such as NE2 with the access type of NR. Therefore, NE1 may send first indication information to NE2 to indicate, to NE2, the communication capability information of the PC5 interface that can be used by NE2 in a case where NE1 and NE2 are coupled in a dual connectivity DC architecture. In addition, when the first message received by NE1 includes the first signaling and the third signaling, the third signaling may also include the communication capability of the PC5 interface that can be used by NE2. Therefore, NE1 may also send the first indication message to NE2, to indicate, to NE2, the communication capability information of the PC5 interface that can be used by NE2 in a case where NE1 and NE2 are coupled in a dual connectivity DC architecture. It may be understood that when the access type of NE1 is NR and the access type of NE2 is LTE, a similar implementation may be made with reference to the above examples, which will not be repeated in the embodiment.

It should also be noted that in the above two implementations, the network device described in the embodiment has received the third signaling, and therefore may receive the communication capability of the PC5 interface that can be used potentially by other network devices. Then, it is set that the network device described in the embodiment does not receive the third signaling, that is, other network devices receive the communication capability of the PC5 interface that can be potentially used by the network device described in the embodiment. Based on this, in a possible implementation, for an access type of the network device being LTE, the first message includes first signaling, wherein representation of the communication capability of the PC5 interface for long term evolution LTE is carried in the first signaling.

For an access type of the network device being NR, the first message includes second signaling, wherein representation of the communication capability of the PC5 interface for new radio NR is carried in the second signaling.

According to the foregoing implementation, the method further includes:

receiving a second indication message sent by another network device than the network device, wherein the second indication message is configured to indicate, to the network device, the communication capability information of the PC5 interface which can be used by the terminal under the control of the network device, in a case where the network device and the other network device are coupled in a dual connectivity DC architecture.

It may be understood that when other network devices receive the communication capability of the PC5 interface that can be used potentially by the network device described in the embodiment, they may send a second indication message to the network device described in the embodiment, so that the network device described in the embodiment obtains the communication capability information of the PC5 interface that can be used when being coupled with the other network devices in the DC architecture.

In addition, in a possible implementation of the embodiment, if there is only one network device in the network architecture shown in FIG. 1, that is, there is no other network device besides the network device, for example, there is only NE1 with the access type of NR or only NE2 with the access type of LTE, for an access type of the network device being LTE, the first message includes first signaling, wherein representation of the communication capability of the PC5 interface for long term evolution LTE is carried in the first signaling.

Based on this, the method further includes: determining, from the first signaling, the communication capability of the PC5 interface used by the terminal under the control of the network device, according to the access type of the network device being the LTE, wherein the first signaling includes at least one or more of: the communication capability information of the PC5 interface LTE-PC5 controlled by an LTE-Uu interface and with the access type of the LTE; the communication capability information of the PC5 interface LTE-PC5 controlled by an NR-Uu interface and with the access type of the LTE; and the communication capability information of the PC5 interface NR-PC5 controlled by the LTE-Uu interface and with the access type of NR.

It may be understood that, at this time, the communication capability of the PC5 interface used by the terminal under the control of the network device may be described by the communication capability information of the PC5 interface LTE-PC5 controlled by the LTE-Uu interface and with the access type of the LTE included in the first signaling.

For an access type of the network device being NR, the first message includes second signaling, wherein representation of the communication capability of the PC5 interface for new radio NR is carried in the second signaling.

Based on this, the method further includes: determining, from the second signaling, the communication capability of the PC5 interface used by the terminal under the control of the network device, according to the access type of the network device being the NR, wherein the second signaling includes at least one or more of: the communication capability information of the PC5 interface NR-PC5 controlled by an NR-Uu interface and with the access type of the NR; the communication capability information of the PC5 interface LTE-PC5 controlled by the NR-Uu interface and with the access type of LTE; and the communication capability information of the PC5 interface NR-PC5 controlled by an LTE-Uu interface and with the access type of the NR. It may be understood that, at this time, the communication capability of the PC5 interface used by the terminal under the control of the network device may be described by the communication capability information of the PC5 interface NR-PC5 controlled by the NR-Uu interface and with the access type of the NR included in the second signaling.

Third Embodiment

Based on the same inventive concept of the foregoing embodiment, an embodiment of the present application provides a method for information transmission, which may be applied to a D2D or V2X technology to implement one network device (a first network device) of at least two network devices (for example, the first network device and a second network device) in an inter-RAT system, and the method may include:

sending, by a first network device, a first message to a second network device, wherein the first message is configured to indicate communication capability information of a PC5 interface which can be used by a terminal. Further, the first message is configured to indicate the communication capability information of the PC5 interface that can be used by the terminal under the control of the second network device.

Those skilled in the art may understand that the description of the first message in the embodiment may be understood with reference to the description in the first and second embodiments, and the description of the first message in the first and second embodiments may be adaptively included in the embodiment.

For example, the first message includes first signaling, second signaling, and third signaling, wherein representation of the communication capability of the PC5 interface for LTE is carried in the first signaling, the representation of the communication capability of the PC5 interface for NR is carried in the second signaling, and the representation of the communication capability of the PC5 interface for an LTE and NR dual connectivity DC is carried in the third signaling.

In an implementation, for an access type of the second network device being LTE, the first message includes first signaling and third signaling, wherein representation of the communication capability of the PC5 interface for long term evolution LTE is carried in the first signaling, and the representation of the communication capability of the PC5 interface for an LTE and NR dual connectivity DC is carried in the third signaling.

In an implementation, for an access type of the second network device being NR, the first message includes second signaling and third signaling, wherein representation of the communication capability of the PC5 interface for new radio NR is carried in the second signaling, and the representation of the communication capability of the PC5 interface for an LTE and NR dual connectivity DC is carried in the third signaling.

In an implementation, for an access type of the second network device being LTE, the first message includes first signaling, wherein representation of the communication capability of the PC5 interface for long term evolution LTE is carried in the first signaling.

In an implementation, for an access type of the second network device being NR, the first message includes second signaling, wherein representation of the communication capability of the PC5 interface for new radio NR is carried in the second signaling.

In an implementation, the method further includes: sending, by the first network device, PC5 configuration information of the terminal under the first network device to the second network device. For example, the PC5 configuration information includes resource configuration information.

In an implementation, the method further includes: sending, by the first network device, PC5 communication demand information reported by the terminal under the first network device to the second network device. For example, the PC5 communication demand information includes sidelink UE information.

In the embodiment, the first network device and the second network device are coupled in a dual connectivity DC architecture. In an application scenario, that is, when the terminal switches from the first network device to the second network device, the first network device send the first message to the second network device.

Fourth Embodiment

Based on the same inventive concept of the foregoing embodiment, an embodiment of the present application provides a method for information transmission, which may be applied to a D2D or V2X technology to implement one network device (a second network device) of at least two network devices (for example, a first network device and the second network device) in an inter-RAT system, and the method may include:

receiving, by a second network device, a first message sent by a first network device, wherein the first message is configured to indicate communication capability information of a PC5 interface which can be used by a terminal. Further, the first message is configured to indicate the communication capability information of the PC5 interface that can be used by the terminal under the control of the second network device.

Those skilled in the art may understand that the description of the first message in the embodiment may be understood with reference to the description in the first, second and third embodiments, and the description of the first message in the first, second and third embodiments may be adaptively included in the embodiment.

In an implementation, for an access type of the second network device being LTE, the first message includes first signaling, wherein representation of the communication capability of the PC5 interface for LTE is carried in the first signaling. Further, the second network device determines the communication capability of the PC5 interface used by the terminal under the control of the second network device from the first signaling, according to the access type of the second network device being the LTE, wherein the first signaling includes at least one or more of: the communication capability information of the PC5 interface LTE-PC5 controlled by an LTE-Uu interface and with the access type of the LTE; the communication capability information of the PC5 interface LTE-PC5 controlled by an NR-Uu interface and with the access type of the LTE; and the communication capability information of the PC5 interface NR-PC5 controlled by the LTE-Uu interface and with the access type of NR.

In an implementation, for an access type of the second network device being NR, the first message includes second signaling, wherein representation of the communication capability of the PC5 interface for new radio NR is carried in the second signaling. Further, the second network device determines the communication capability of the PC5 interface used by the terminal under the control of the second network device from the second signaling, according to the access type of the second network device being the NR, wherein the second signaling includes at least one or more of: the communication capability information of the PC5 interface NR-PC5 controlled by an NR-Uu interface and with the access type of the NR; the communication capability information of the PC5 interface LTE-PC5 controlled by the NR-Uu interface and with the access type of LTE; and the communication capability information of the PC5 interface NR-PC5 controlled by an LTE-Uu interface and with the access type of the NR.

In the embodiment, the first network device and the second network device are coupled in a dual connectivity DC architecture. In an application scenario, that is, when the terminal switches from the first network device to the second network device, the first network device sends the first message to the second network device.

Fifth Embodiment

Based on the same inventive concept of the foregoing embodiment, the embodiment uses the following specific examples to illustrate the technical solutions of the foregoing two embodiments. In the embodiment, in conjunction with the architecture shown in FIG. 1, a vehicle terminal A is under an inter-RAT system, and thus the vehicle terminal A accesses a network device 1 and a network device 2 simultaneously. In the embodiment, in order to clearly describe technical solution, the access type of the network device 1 is set to be LTE, and the access type of the network device 2 is set to be NR. It may be understood that those skilled in the art may similarly apply the technical solution of the embodiment to the case where the access type of the network device 1 is NR and the access type of the network device 2 is LTE, which will not be repeated herein.

Specific Example I

FIG. 5A shows a specific implementation process of a method for information transmission provided by an embodiment of the present application, and referring to FIG. 5, the process may include the following steps.

In S501, the vehicle terminal A carries communication capability information thereof about an PC5 interface in first signaling, second signaling, and third signaling respectively.

It should be noted that in the specific example, the communication capability information of the vehicle terminal A on the PC5 interface includes: first indication information, configured to indicate an access type of the PC5 interface; and/or second indication information, configured to indicate the access type of a Uu interface that can control the PC5 interface. It may be understood that the specific implementation of the first indication information and the second indication information may refer to the corresponding description in the first embodiment, which will not be repeated here.

In addition, the first signaling, the second signaling, and the third signaling may be the specific implementation of report information needed to be sent by the terminal to the network device. Specifically, in the communication capability information of the vehicle terminal A on the PC5 interface, representation of a communication capability of the PC5 interface for long term evolution LTE is carried in first signaling, as shown in the slash-filled box in FIG. 3; representation of a communication capability of the PC5 interface for new radio NR is carried in second signaling, as shown in the dot-filled box in FIG. 3; and representation of a communication capability of the PC5 interface for an LTE and NR dual connectivity DC is carried in third signaling, as shown in the cross-line-filled box in FIG. 3. It may be understood that the content included in the above three types of signaling may also refer to the description of the corresponding part in the first embodiment, which will not be repeated here.

In S502, the vehicle terminal A sends the first signaling, the second signaling, and the third signaling to the network device 1.

In S503, the network device 1 determines the communication capability of the PC5 interface used by the vehicle terminal A under the control of the network device 1 according to the access type of the network device 1 itself and the first signaling, the second signaling, and the third signaling.

In S504, the network device 1 determines the communication capability of the PC5 interface used by the vehicle terminal A under the control of the network device 2 according to the communication capability of the PC5 interface used by the vehicle terminal A under the control of the network device 1.

In S505, the network device 1 sends the communication capability of the PC5 interface used by vehicle terminal A under the control of the network device 2 to the network device 2.

For S504 and S505, it may be understood that in a possible implementation process, the network device 1 may directly determine the communication capability of the PC5 interface used by the vehicle terminal A under the control of the network device 2 and send the same to the network device 2. In addition, in another possible implementation process, what the network device 1 determines and sends to the network device 2 may be the communication capability of the PC5 interface that can be used potentially by the vehicle terminal A under the control of the network device 2. After receiving the communication capability of the PC5 interface that can be used potentially, the network device 2 may determine the access type of the network device 2 itself, and determine the communication capability of the PC5 interface actually used by the vehicle terminal A under the control of the network device 2.

It can be seen through the steps of S504 and S505 that in the specific example, the network device 1 and the network device 2 may be regarded as having a master-slave relationship, that is, the network device 1 may be regarded as a master network device, and the network device 2 may be considered as a slave network device.

After both the network device 1 and the network device 2 obtain the communication capability of the PC5 interface used by the vehicle terminal A under the control thereof, they provide feedback to the vehicle terminal A. Therefore, referring to FIG. 5B, the specific example will continue to the following steps.

In S506, the network device feeds back the communication capability of the PC5 interface used by the vehicle terminal A under the control of the network device to the vehicle terminal A.

In S507, the vehicle terminal A determines the communication capability of the PC5 interface to be reserved for use according to the feedback.

Figure 5B:
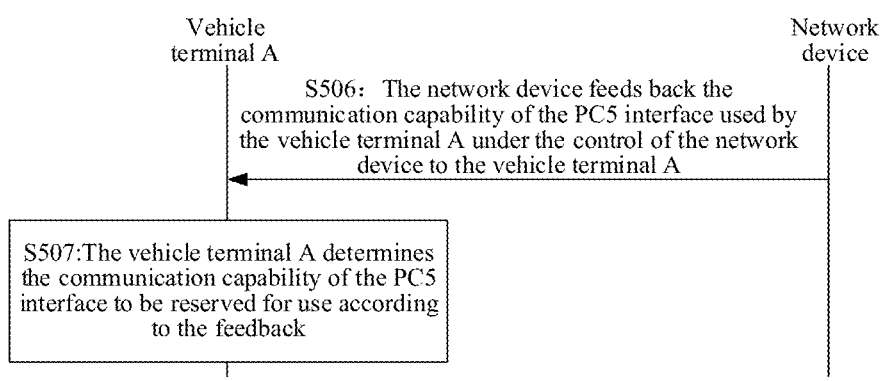
FIG. 5B is a schematic diagram of a feedback process provided by an embodiment of the present application.

It should be noted that in the process shown in FIG. 5B, the network device may be the aforementioned network device 1 or 2. After the two network devices respectively feedback the communication capability of the PC5 interface used by the vehicle terminal A under the control thereof to the vehicle terminal A, the vehicle terminal A may determine the communication capability of the PC5 interface reserved for use by the vehicle terminal A itself according to the feedback.

Through the above process, each device in the architecture shown in FIG. 1 knows or learns the communication capability of the PC5 interface used by itself, so as to realize the coordination of the communication capability of the PC5 interface of the terminal under the coverage with different network types.

It may also be noted that, in addition to determining the communication capability of the PC5 interface to be reserved for use by itself according to the feedback, the vehicle terminal A may reserve the communication capability of the PC5 interface used by itself in advance. It should be noted that as for the specific description of that the vehicle terminal A reserves the communication capability of the PC5 interface to be used, please refer to the corresponding description in the first embodiment, which will not be repeated here.

Specific Example II

Figure 6:
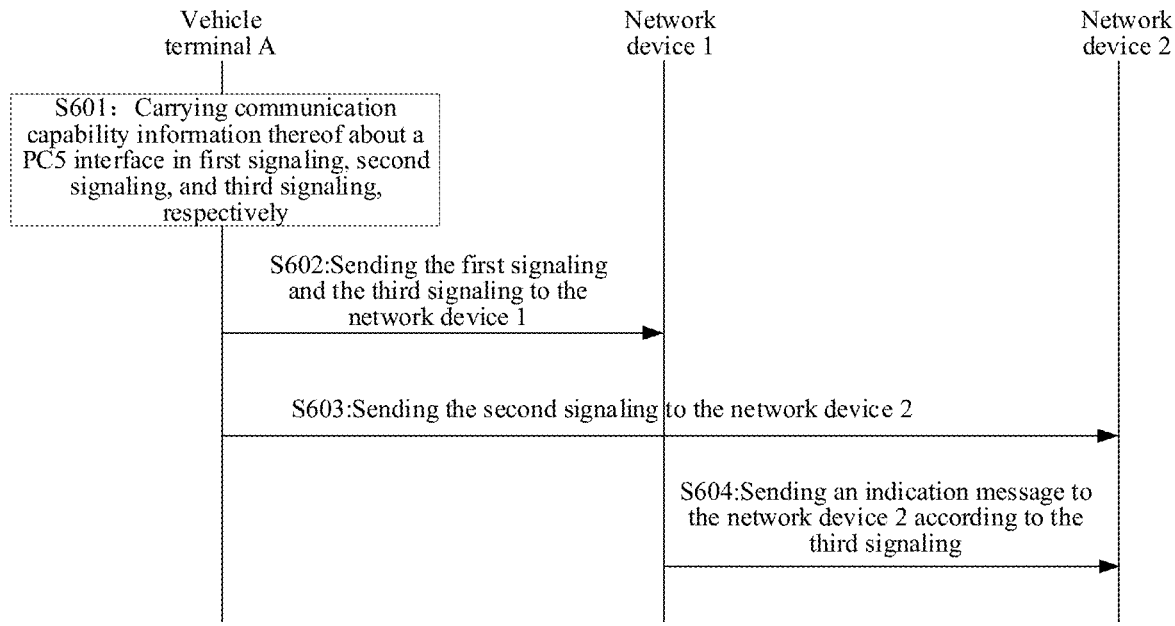
FIG. 6 is a schematic diagram of a specific implementation process of another method for information transmission provided by an embodiment of the present application.

FIG. 6 shows a specific implementation process of a method for information transmission provided by an embodiment of the present application, and referring to FIG. 6, the process may include the following steps.

In S601, the vehicle terminal A carries communication capability information thereof about a PC5 interface in first signaling, second signaling, and third signaling, respectively.

It may be understood that the specific description of S601 may refer to the specific description of S501 in the foregoing specific example, and details thereof are not repeated here.

In S602, the vehicle terminal A sends the first signaling and the third signaling to the network device 1.

In S603, the vehicle terminal A sends the second signaling to the network device 2.

It may be understood that the vehicle terminal sends, according to corresponding access types, the three types of signaling to the network devices with the same access types. Therefore, each network device may obtain the communication capability of the PC5 interface used by itself according to the signaling received, so as to realize the coordination of the communication capability of the PC5 interface of the terminal under the coverage with different network types.

In S604, the network device 1 sends an indication message to the network device 2 according to the third signaling.

It may be understood that, the indication message may indicate, to the network device 2, the communication capabilities of the PC5 interface that can be used by the vehicle terminal A under the control of the network device 2 when the network device 1 and the network device 2 are coupled in the DC architecture. It may be understood that in a possible implementation process, the indication message may be the communication capability of the PC5 interface used by the vehicle terminal A under the control of the network device 2 that the network device 1 directly determines and sends to the network device 2. In addition, in another possible implementation process, the indication message may be the communication capability of the PC5 interface that can be used potentially by the vehicle terminal A under the control of the network device 2, which may be determined and sent to the network device 2 by the network device 1. After receiving the communication capability of the PC5 interface that can be used potentially, the network device 2 may determine the communication capability of the PC5 interface actually used by the vehicle terminal A under the control of the network device 2 according to the access type of the network device 2 itself.

For S602 to S604, if the vehicle terminal A sends the first signaling to the network device 1, and sends the second signaling and the third signaling to the network device 2, the network device 2 may send the indication message to the network device 1 according to the third signaling. It may be understood that, the indication message is configured to indicate, to the network device 1, the communication capability of the PC5 interface that can be used by the vehicle terminal A under the control of the network device 1 when the network device 1 and the network device 2 are coupled in the DC architecture.

In this specific example, since each network device receives the signaling sent by the vehicle terminal A, each network device may obtain the communication capability of the PC5 interface used by the vehicle terminal A under the control thereof according to the signaling received by itself. Then, each network device may also feedback the communication capability of the PC5 interface used by the vehicle terminal A under the control thereof to the vehicle terminal A, so that the vehicle terminal A may determine the communication capability of the PC5 interface to be reserved for use by the terminal device A according to the fed back communication capability of the PC5 interface used by each network device itself. The specific description of the process may refer to S506 and S507 described in the foregoing specific example I, which will not be repeated here.

Sixth Embodiment

Figure 7:
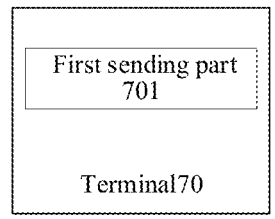
FIG. 7 is a schematic composition diagram of a terminal provided by an embodiment of the present application.

Based on the same inventive concept of the foregoing embodiment, FIG. 7 shows a schematic composition diagram of a terminal 70 provided by an embodiment of the present application, and referring to FIG. 7, the terminal may include: a first sending part 701, configured to send a first message to a network device, wherein the first message includes communication capability information of the terminal on a PC5 interface.

Exemplarily, the communication capability information of the terminal on the PC5 interface includes: a combination of a communication capability of the PC5 interface supported by the terminal under control of a first network device and the communication capability of the PC5 interface supported by the terminal under control of a second network device, wherein the first network device and the second network device are coupled by a dual connectivity architecture.

Exemplarily, the first network device and the second network device are synchronized with each other.

Exemplarily, the first network device and the second network device are not synchronized with each other.

Exemplarily, access types of the first network device and the second network device are both LTE.

Exemplarily, access types of the first network device and the second network device are both NR.

Exemplarily, an access type of the first network device is LTE, and the access type of the second network device is NR.

Exemplarily, the communication capability information of the terminal on the PC5 interface includes:
first indication information for indicating an access type of the PC5 interface, and/or second indication information for indicating the access type of a Uu interface which can control the PC5 interface.

Exemplarily, in the communication capability information of the terminal on the PC5 interface included in the first message:
representation of a communication capability of the PC5 interface for long term evolution LTE is carried in first signaling;
representation of a communication capability of the PC5 interface for new radio NR is carried in second signaling; and
representation of a communication capability of the PC5 interface for an LTE and NR dual connectivity DC is carried in third signaling.

Exemplarily, in the communication capability information of the terminal on the PC5 interface included in the first message, representation of a communication combination of the PC5 interface for an LTE and LTE dual connectivity is carried in first signaling.

Exemplarily, in the communication capability information of the terminal on the PC5 interface included in the first message, representation of a communication capability combination of the PC5 interface for an LTE and LTE dual connectivity is carried in third signaling.

Exemplarily, in the communication capability information of the terminal on the PC5 interface included in the first message, representation of a communication capability combination of the PC5 interface for an LTE and LTE dual connectivity is carried in fourth signaling.

Exemplarily, in the communication capability information of the terminal on the PC5 interface included in the first message, representation of a communication capability combination of the PC5 interface for an NR and NR dual connectivity is carried in second signaling.

Exemplarily, in the communication capability information of the terminal on the PC5 interface included in the first message, representation of a communication capability combination of the PC5 interface for an NR and NR dual connectivity is carried in third signaling.

Exemplarily, in the communication capability information of the terminal on the PC5 interface included in the first message, representation of a communication capability combination of the PC5 interface for an NR and NR dual connectivity is carried in fifth signaling.

In the above example, the first signaling includes at least one or more of:
the communication capability information of the PC5 interface LTE-PC5 controlled by an LTE-Uu interface and with an access type of LTE;
the communication capability information of the PC5 interface LTE-PC5 controlled by an NR-Uu interface and with the access type of the LTE; and
the communication capability information of the PC5 interface NR-PC5 controlled by the LTE-Uu interface and with the access type of NR.

In the above example, the second signaling includes at least one or more of:
the communication capability information of the PC5 interface NR-PC5 controlled by an NR-Uu interface and with an access type of NR;
the communication capability information of the PC5 interface LTE-PC5 controlled by the NR-Uu interface and with the access type of LTE; and the communication capability information of the PC5 interface NR-PC5 controlled by an LTE-Uu interface and with the access type of the NR.

In the above example, the third signaling includes a combination of the communication capability information of at least two of:

the communication capability information of an LTE-Uu interface;

the communication capability information of an NR-Uu interface;

the communication capability information of the PC5 interface NR-PC5 controlled by the NR-Uu interface and with an access type of NR;

the communication capability information of the PC5 interface LTE-PC5 controlled by the LTE-Uu interface and with the access type of LTE;

the communication capability information of the PC5 interface LTE-PC5 controlled by the NR-Uu interface and with the access type of the LTE; and the communication capability information of the PC5 interface NR-PC5 controlled by the LTE-Uu interface and with the access type of the NR.

In the above example, the third signaling further includes identification information for indicating the communication capability, and the identification information of the communication capability indicates the communication capability information defined in the first signaling and/or the second signaling.

In the above solution, the third signaling further includes identification information for indicating that the terminal device supports a dual connectivity architecture of LTE-Uu and NR-Uu synchronized with each other.

In the above solution, the third signaling further includes identification information for indicating that the terminal device supports a dual connectivity architecture of LTE-Uu and NR-Uu not synchronized with each other.

In the above solution, a communication capability of the PC5 interface for an LTE and LTE dual connectivity includes: identification information for indicating that the terminal device supports a dual connectivity architecture of LTE-Uu and LTE-Uu synchronized with each other.

In the above solution, a communication capability of the PC5 interface for an LTE and LTE dual connectivity includes: identification information for indicating that the terminal device supports a dual connectivity architecture of LTE-Uu and LTE-Uu not synchronized with each other.

In the above solution, a communication capability of the PC5 interface for an NR and NR dual connectivity includes: identification information for indicating that the terminal device supports a dual connectivity architecture of NR-Uu and NR-Uu synchronized with each other.

In the above solution, a communication capability of the PC5 interface for an NR and NR dual connectivity includes: identification information for indicating that the terminal device supports a dual connectivity architecture of NR-Uu and NR-Uu not synchronized with each other.

In the above solution, the first sending part 701 is configured to send the first signaling, the second signaling, and the third signaling to one target network device among at least two network devices.

In the above solution, the first sending part 701 is configured to:

send the first signaling to a first network device with an access type of LTE;

send the second signaling to a second network device with the access type of NR; and send the third signaling to the first network device or the second network device.

In the above solution, the first sending part 701 is configured to send a communication combination of the PC5 interface for an LTE and LTE dual connectivity to a first network device and/or a second network device, wherein the first network device and the second network device form an LTE and LTE dual connectivity architecture.

In the above solution, the first sending part 701 is configured to send a communication combination of the PC5 interface for an NR and NR dual connectivity to a first network device and/or a second network device, wherein the first network device and the second network device form an NR and NR dual connectivity architecture.

Figure 8:
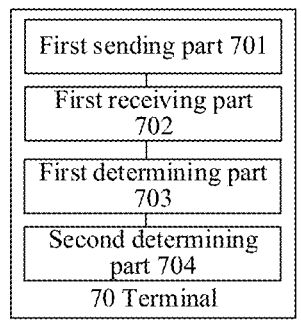
FIG. 8 is a schematic composition diagram of another terminal provided by an embodiment of the present application.

In the above solution, referring to FIG. 8, the terminal 70 further includes: a first receiving part 702, configured to receive a second message sent by the network device, wherein the second message is configured to indicate a communication capability of the PC5 interface used by the terminal under control of the network device.

In the above solution, referring to FIG. 8, the terminal 70 further includes: a first receiving part 702, configured to receive a third message sent by the network device, wherein the third message is configured to indicate a communication capability of the PC5 interface controlled by the network device. Further, the communication capability of the PC5 interface controlled by the network device includes an RAT of the PC5 interface controlled by the network device.

In the above solution, the terminal 70 further includes: a determining part (not shown), configured to determine whether to report the communication capability of the PC5 interface of at least one of the followings according to the third message:

the communication capability information of the PC5 interface LTE-PC5 controlled by an LTE-Uu interface and with an access type of LTE;

the communication capability information of the PC5 interface LTE-PC5 controlled by an NR-Uu interface and with the access type of the LTE;

the communication capability information of the PC5 interface NR-PC5 controlled by the LTE-Uu interface and with the access type of NR; and the communication capability information of the PC5 interface NR-PC5 controlled by the NR-Uu interface and with the access type of the NR.

In the above solution, referring to FIG. 8, the terminal 70 further includes: a first determining part 703, configured to determine the communication capability of the PC5 interface used by the terminal, according to the communication capability of the PC5 interface used by the terminal under the control of the network device indicated in the second message.

In the above solution, referring to FIG. 8, the terminal 70 further includes: a second determining part 704, configured to determine by itself the communication capability of the PC5 interface used by the terminal, before the first sending part 701 sends the first message to the network device.

In the above solution, the communication capability information of the PC5 interface used by the terminal includes:

the communication capability information of the PC5 interface to be reported by the terminal to another network device than the network device; and/or the communication capability of the PC5 interface used by the terminal outside the control of the network device.

In the above solution, the communication capability of the PC5 interface that is not included in the report information is the communication capability of the PC5 interface used by the terminal outside the control of the network device.

In the above solution, a communication priority of the PC5 interface under the control of the network device is higher than that of the PC5 interface used by the terminal outside the control of the network device.

It may be understood that in the embodiment, the "part" may be a part of a circuit, a part of a processor, a part of a program or software and the like, however, it may also be a unit, a module, or a non-modularized one.

In addition, various components in the embodiment may be integrated into one processing unit, or respective units may be separated from each other physically, or two or more units may be integrated into one unit. The above integrated unit may be implemented in the form of hardware or software functional module.

If the integrated unit is implemented in the form of a software functional module and is not sold or used as an independent product, it may be stored in a computer readable storage medium. In view of such understanding, part of the technical solution of the embodiment that is essential or make a contribution to the prior art or all or part of the technical solution may be embodied in the form of a software product. The computer software product is stored in a storage medium and includes several instructions to enable a computer device (which may a personal computer, a server, a network device or the like) or a processor to execute all or part of the steps of the method described in the embodiment. The aforementioned storage media includes: a U disk, a mobile hard disk, a read only memory, a random access memory (RAM), a magnetic disk, an optical disk, or other media that can store program codes.

Therefore, the embodiment provides a computer storage medium storing a program for information transmission that, when being executed by at least one processor, implements the step in the method for information transmission according to the above first embodiment.

Figure 9:
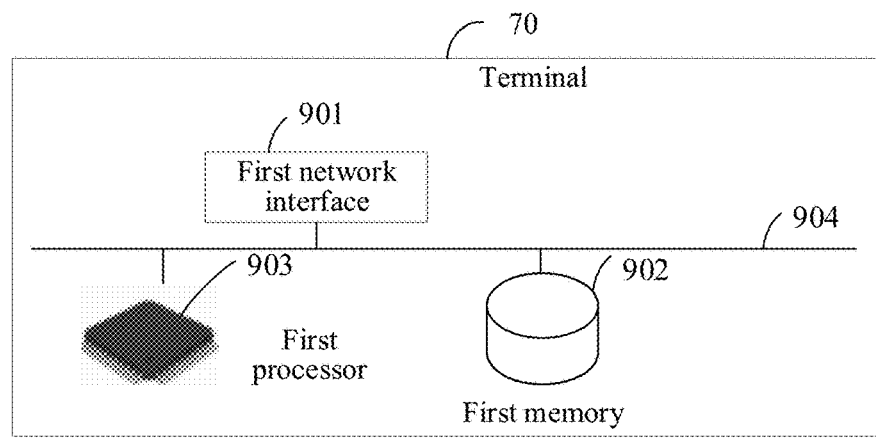
FIG. 9 is a schematic diagram of a specific hardware structure of a terminal provided by an embodiment of the present application.

Based on the foregoing terminal 70 and computer storage medium, FIG. 9 shows a specific hardware structure of a terminal 70 provided by an embodiment of the present application, and referring to FIG. 9, the terminal 70 may include: a first network interface 901, a first memory 902, and a first processor 903, and respective components are coupled together through a bus system 904. It can be understood that the bus system 904 is used to implement connection and communication between these components. The bus system 904 includes a data bus as well as a power bus, a control bus, and a status signal bus. However, for clarity of description, various buses are marked as the bus system 904 in FIG. 9.

The first network interface 901 is configured to send and receive a signal in an information receiving and sending process with other external network elements.

The first memory 902 is configured to store a computer program that can be run on the first processor 903.

The first processor 903 is configured to execute the following step when running the computer program: sending a first message to a network device, wherein the first message includes communication capability information of the terminal on a PC5 interface.

It may be understood that the first memory 902 in the embodiment of the present application may be a volatile memory or a non-volatile memory, or may include both the volatile and non-volatile memories. The non-volatile memory may be a read-only memory (ROM), a programmable read-only memory (PROM), an erasable programmable read-only memory (EPROM), an electrically erasable programmable read-only memory (EEPROM) or flash memory. The volatile memory may be a random access memory (RAM), which is used as an external cache. By way of exemplary but not restrictive description, many forms of RAM are available, for example, a static random access memory (SRAM), a dynamic random access memory (DRAM), a synchronous dynamic random access memory (SDRAM), a double data rate SDRAM (DDRSDRAM), an enhanced synchronous dynamic random access memory (ESDRAM), a synchlink dynamic random access memory (SLDRAM) and a direct Rambus RAM (DRRAM). The first memory 902 of the systems and methods described herein is intended to include, but is not limited to, these and any other suitable types of memory.

The first processor 903 may be an integrated circuit chip with signal processing capability. In the implementation process, the steps of the foregoing method may be achieved by instructions in the form of software or an integrated logic circuit as hardware in the first processor 903. The above first processor 903 may be a general-purpose processor, a digital signal processor (DSP), an application specific integrated circuit (ASIC), a field programmable gate array (FPGA) or other programmable logic devices, a discrete gate or transistor logic device, and a discrete hardware component. The respective methods, steps, and logical block diagrams disclosed in the embodiment of the present application may be implemented or executed. The general-purpose processor may be a microprocessor or the processor may also be any conventional processor or the like. The steps of the method disclosed in the embodiment of the present application may be directly embodied as being executed and achieved by a hardware decoding processor, or executed and completed by a combination of hardware and software modules in the decoding processor. The software module may be located in a mature storage medium in the field, such as a random access memory, a flash memory, a read-only memory, a programmable read-only memory, or an electrically erasable programmable memory, an a register. The storage medium is located in the first memory 902, and the first processor 903 reads the information in the first memory 902, and achieves the steps of the foregoing method in combination with the hardware thereof.

It may be understood that these embodiments described herein may be implemented by a hardware, a software, a firmware, a middleware, a microcode, or a combination thereof. For a hardware implementation, a processing unit may be implemented in one or more of an application specific integrated circuit (ASIC), digital signal processing (DSP), a digital signal processing device (DSPD), a programmable logic device (PLD), a field-programmable gate array (FPGA), a general-purpose processor, a controller, a microcontroller, a microprocessor, others electronic units for performing the functions described in the application or a combination thereof.

For a software implementation, the technology described herein may be implemented by a module (for example, a procedure, a function and the like) that performs the function described herein. A software code may be stored in a memory and executed by a processor. The memory may be implemented in the processor or external to the processor.

Specifically, the first processor 903 in the terminal 90 is also configured to, when running a computer program, execute the step in the method described in the foregoing first embodiment, which will not be repeated here.

Seventh Embodiment

Figure 10:
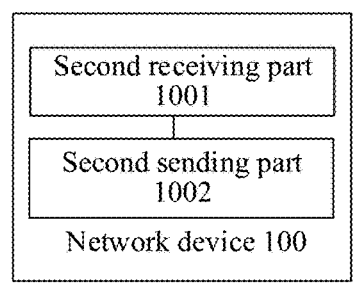
FIG. 10 is a schematic composition diagram of a network device provided by an embodiment of the present application.

Based on the same inventive concept of the foregoing embodiment, FIG. 10 shows the composition of a network device 100 provided by an embodiment of the present application, and referring to FIG. 10, the network device 100 includes a second receiving part 1001 and a second sending part 1002.

The second receiving part 1001 is configured to receiving a first message sent by a terminal, wherein the first message includes communication capability information of the terminal on a PC5 interface.

The second sending part 1002 is configured to send a second message to the terminal, wherein the second message is configured to indicate a communication capability of the PC5 interface used by the terminal under control of the network device.

Exemplarily, the first message includes first signaling, second signaling, and third signaling, wherein representation of the communication capability of the PC5 interface for long term evolution LTE is carried in the first signaling, the representation of the communication capability of the PC5 interface for new radio NR is carried in the second signaling, and the representation of the communication capability of the PC5 interface for an LTE and NR dual connectivity DC is carried in the third signaling.

Exemplarily, for an access type of the network device being LTE, the first message includes first signaling and third signaling, wherein representation of the communication capability of the PC5 interface for long term evolution LTE is carried in the first signaling, and the representation of the communication capability of the PC5 interface for an LTE and NR dual connectivity DC is carried in the third signaling.

Exemplarily, for an access type of the network device being NR, the first message includes second signaling and third signaling, wherein representation of the communication capability of the PC5 interface for new radio NR is carried in the second signaling, and the representation of the communication capability of the PC5 interface for an LTE and NR dual connectivity DC is carried in the third signaling.

In the above three examples, the second sending part 1002 is further configured to: send a first indication message to another network device than the network device after the second receiving part 1001 receives the first message sent by the terminal, wherein the first indication message is configured to indicate, to the other network device, the communication capability information of the PC5 interface which can be used by the terminal under control of the other network device, in a case where the network device and the other network device are coupled in a dual connectivity DC architecture.

Exemplarily, for an access type of the network device being LTE, the first message includes first signaling, wherein representation of the communication capability of the PC5 interface for long term evolution LTE is carried in the first signaling.

Exemplarily, for an access type of the network device being NR, the first message includes second signaling, wherein representation of the communication capability of the PC5 interface for new radio NR is carried in the second signaling.

In the above two examples, the second receiving part 1001 is further configured to:

receive a second indication message sent by another network device than the network device, wherein the second indication message is configured to indicate, to the network device, the communication capability information of the PC5 interface which can be used by the terminal under the control of the network device, in a case where the network device and the other network device are coupled in a dual connectivity DC architecture.

Based on the above two examples, for that there is no other network device than the network device, optionally, a determining part may be further included, and be configured to determine, from the first signaling, the communication capability of the PC5 interface used by the terminal under the control of the network device, according to the access type of the network device being the LTE, wherein the first signaling comprises at least one or more of: the communication capability information of the PC5 interface LTE-PC5 controlled by an LTE-Uu interface and with the access type of the LTE; the communication capability information of the PC5 interface LTE-PC5 controlled by an NR-Uu interface and with the access type of the LTE; and the communication capability information of the PC5 interface NR-PC5 controlled by the LTE-Uu interface and with the access type of NR.

Alternatively, the determining part is optionally configured to determine, from the second signaling, the communication capability of the PC5 interface used by the terminal under the control of the network device, according to the access type of the network device being the NR, wherein the second signaling includes at least one or more of: the communication capability information of the PC5 interface NR-PC5 controlled by an NR-Uu interface and with the access type of the NR; the communication capability information of the PC5 interface LTE-PC5 controlled by the NR-Uu interface and with the access type of LTE; and the communication capability information of the PC5 interface NR-PC5 controlled by an LTE-Uu interface and with the access type of the NR.

Eighth Embodiment

Based on the same inventive concept as the foregoing embodiment, an embodiment of the present application provides a network device composition, which is called a first network device, and includes:

a sending part, configured to send a first message to a second network device, wherein the first message is configured to indicate communication capability information of a PC5 interface which can be used by a terminal, and further the first message is configured to indicate the communication capability information of the PC5 interface which can be used by the terminal under control of the second network device.

Exemplarily, the first message includes first signaling, second signaling, and third signaling, wherein representation of the communication capability of the PC5 interface for long term evolution LTE is carried in the first signaling, the representation of the communication capability of the PC5 interface for new radio NR is carried in the second signaling, and the representation of the communication capability of the PC5 interface for an LTE and NR dual connectivity DC is carried in the third signaling.

Exemplarily, for an access type of the second network device being LTE, the first message includes first signaling and third signaling, wherein representation of the communication capability of the PC5 interface for long term evolution LTE is carried in the first signaling, and the representation of the communication capability of the PC5 interface for an LTE and NR dual connectivity DC is carried in the third signaling.

Exemplarily, for an access type of the second network device being NR, the first message includes second signaling and third signaling, wherein representation of the communication capability of the PC5 interface for new radio NR is carried in the second signaling, and the representation of the communication capability of the PC5 interface for an LTE and NR dual connectivity DC is carried in the third signaling.

Exemplarily, for an access type of the second network device being LTE, the first message includes first signaling, wherein representation of the communication capability of the PC5 interface for long term evolution LTE is carried in the first signaling.

Exemplarily, for an access type of the second network device being NR, the first message includes second signaling, wherein representation of the communication capability of the PC5 interface for new radio NR is carried in the second signaling.

Exemplarily, the sending part is further configured to send PC5 configuration information of the terminal under the first network device to the second network device. For example, the PC5 configuration information includes resource configuration information.

Exemplarily, the sending part is further configured to send PC5 communication demand information reported by the terminal under the first network device to the second network device. For example, the PC5 communication demand information includes sidelink UE information.

Exemplarily, the first network device and the second network device are coupled in a dual connectivity DC architecture.

Exemplarily, when the terminal switches from the first network device to the second network device, the sending part sends the first message to the second network device.

Ninth Embodiment

Based on the same inventive concept as the foregoing embodiment, an embodiment of the present application provides a network device composition, which is called a second network device, and includes:

a receiving part, configured to receive a first message sent by a first network device, wherein the first message is configured to indicate communication capability information of a PC5 interface which can be used by a terminal. Further, the first message is configured to indicate the communication capability information of the PC5 interface which can be used by the terminal under control of the second network device.

Exemplarily, for an access type of the second network device being LTE, the first message includes first signaling, wherein representation of the communication capability of the PC5 interface for long term evolution LTE is carried in the first signaling.

Exemplarily, for an access type of the second network device being NR, the first message includes second signaling, wherein representation of the communication capability of the PC5 interface for new radio NR is carried in the second signaling.

Exemplarily, the network device further includes a determining part, configured to determine the communication capability of the PC5 interface used by the terminal under the control of the second network device from the first signaling, according to the access type of the second network device being the LTE, wherein the first signaling includes at least one or more of: the communication capability information of the PC5 interface LTE-PC5 controlled by an LTE-Uu interface and with the access type of the LTE; the communication capability information of the PC5 interface LTE-PC5 controlled by an NR-Uu interface and with the access type of the LTE; and the communication capability information of the PC5 interface NR-PC5 controlled by the LTE-Uu interface and with the access type of NR.

Exemplarily, the network device further includes: a determining part, configured to determine the communication capability of the PC5 interface used by the terminal under the control of the second network device from the second signaling, according to the access type of the second network device being the NR, wherein the second signaling includes at least one or more of: the communication capability information of the PC5 interface NR-PC5 controlled by an NR-Uu interface and with the access type of the NR; the communication capability information of the PC5 interface LTE-PC5 controlled by the NR-Uu interface and with the access type of LTE; and the communication capability information of the PC5 interface NR-PC5 controlled by an LTE-Uu interface and with the access type of the NR.

Exemplarily, the first network device and the second network device are coupled in a dual connectivity DC architecture.

Exemplarily, when the terminal switches from the first network device to the second network device, the receiving part receives the first message sent by the first network device.

In addition, the embodiment provides a computer storage medium storing a program for information transmission that, when being executed by at least one processor, implements the step in the method according to the second embodiment. Regarding the computer storage medium, please refer to the specific description in the third embodiment, which is not repeated herein.

Figure 11:
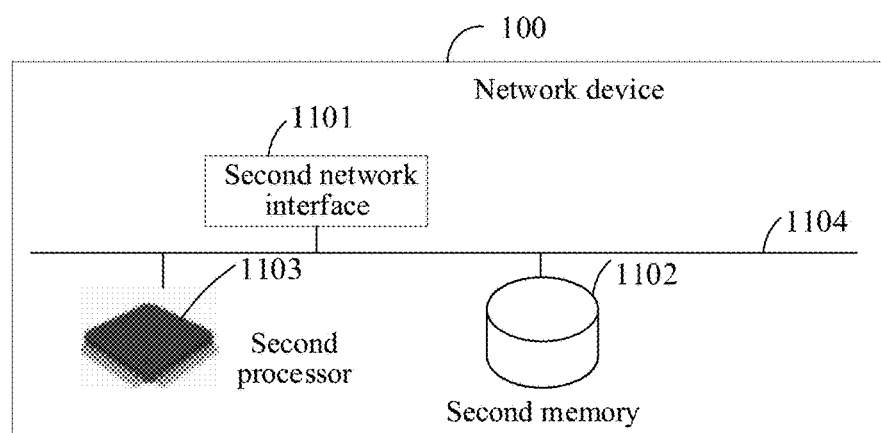
FIG. 11 is a schematic diagram of a specific hardware structure of a network device provided by an embodiment of the present application.

Based on the above network device 100 and computer storage medium, FIG. 11 shows a specific hardware structure of a network device 100 provided by an embodiment of the present application, and referring to FIG. 11, the network device 100 may include: a second network interface 1101, a second memory 1102, and a second processor 1103, and respective components are coupled together through a bus system 1104. It can be understood that the bus system 1104 is used to implement connection and communication between these components. The bus system 1104 includes a data bus as well as a power bus, a control bus, and a status signal bus. However, for clarity of description, various buses are marked as the bus system 1104 in FIG. 11.

The second network interface 1101 is configured to send and receive a signal in an information receiving and sending process with other external network elements.

The second memory 1102 is configured to store a computer program that can be run on the second processor 1103.

The second processor 1103 is configured to execute the following step when running the computer program:

receiving a first message sent by a terminal, wherein the first message includes communication capability information of the terminal on a PC5 interface; and sending, for the first message, a second message to the terminal, wherein the second message is configured to indicate a communication capability of the PC5 interface used by the terminal under control of the network device.

It may be understood that the components in the specific hardware structure of the network device 100 in the embodiment are similar to the corresponding parts in the third embodiment, and will not be repeated here.

Specifically, the second processor 1103 in the network device 100 is further configured to execute the step in the method described in the above second embodiment when running the computer program, which is not repeated herein.

It should be noted that the technical solutions described in the embodiments of the present application may be combined arbitrarily in case of no conflict therebetween.

The above are only specific implementations of the present application, and the protection scope of the present application is not limited thereto. Any person skilled in the art may easily make changes or substitutions within the technical scope disclosed in the present application, which should fall within the protection scope of the present application. Therefore, the protection scope of the present application should be subject to the protection scope of the claims.

What is claimed is:

1. A method for information transmission applied to a terminal, the method comprising:
    sending a first message to a network device, wherein the first message comprises communication capability information of the terminal on a PC5 interface,
    wherein in the communication capability information of the terminal on the PC5 interface comprised in the first message, representation of a communication capability of the PC5 interface for long term evolution LTE is carried in first signaling, and the representation of the communication capability of the PC5 interface for new radio NR is carried in second signaling.

2. The method according to claim 1, wherein the communication capability information of the terminal on the PC5 interface comprises:
    a combination of the communication capability of the PC5 interface supported by the terminal under control of a first network device and the communication capability of the PC5 interface supported by the terminal under control of a second network device,
    wherein the first network device and the second network device are coupled by a dual connectivity architecture, and
    wherein the first network device and the second network device are synchronized with each other.

3. The method according to claim 1, wherein the communication capability information of the terminal on the PC5 interface comprises:
    a combination of the communication capability of the PC5 interface supported by the terminal under control of a first network device and the communication capability of the PC5 interface supported by the terminal under control of a second network device,
    wherein the first network device and the second network device are coupled by a dual connectivity architecture, and
    wherein the first network device and the second network device are not synchronized with each other.

4. The method according to claim 1, wherein the communication capability information of the terminal on the PC5 interface comprises:
    a combination of the communication capability of the PC5 interface supported by the terminal under control of a first network device and the communication capability of the PC5 interface supported by the terminal under control of a second network device,
    wherein the first network device and the second network device are coupled by a dual connectivity architecture, and
    wherein access types of the first network device and the second network device are both LTE.

5. The method according to claim 1, wherein the communication capability information of the terminal on the PC5 interface comprises:
    a combination of the communication capability of the PC5 interface supported by the terminal under control of a first network device and the communication capability of the PC5 interface supported by the terminal under control of a second network device,
    wherein the first network device and the second network device are coupled by a dual connectivity architecture, and
    wherein access types of the first network device and the second network device are both NR.

6. The method according to claim 1, wherein the communication capability information of the terminal on the PC5 interface comprises:
    a combination of the communication capability of the PC5 interface supported by the terminal under control of a first network device and the communication capability of the PC5 interface supported by the terminal under control of a second network device,
    wherein the first network device and the second network device are coupled by a dual connectivity architecture, and
    wherein an access type of the first network device is LTE, and the access type of the second network device is NR.

7. The method according to claim 1, wherein the communication capability information of the terminal on the PC5 interface comprises:
    first indication information for indicating an access type of the PC5 interface, and/or
    second indication information for indicating the access type of a Uu interface which can control the PC5 interface.

8. The method according to claim 1, wherein, in the communication capability information of the terminal on the PC5 interface comprised in the first message, representation of the communication capability of the PC5 interface for an LTE and NR dual connectivity DC is carried in third signaling.

9. The method according to claim 1, wherein, in the communication capability information of the terminal on the PC5 interface comprised in the first message, representation of a communication combination of the PC5 interface for an LTE and LTE dual connectivity is carried in the first signaling.

10. The method according to claim 1, wherein, in the communication capability information of the terminal on the PC5 interface comprised in the first message, representation of a communication capability combination of the PC5 interface for an LTE and LTE dual connectivity is carried in third signaling.

11. The method according to claim 1, wherein in the communication capability information of the terminal on the PC5 interface comprised in the first message, representation of a communication capability combination of the PC5 interface for an LTE and LTE dual connectivity is carried in fourth signaling.

12. The method according to claim 1, wherein, in the communication capability information of the terminal on the PC5 interface comprised in the first message, representation of a communication capability combination of the PC5 interface for an NR and NR dual connectivity is carried in the second signaling.

13. The method according to claim 1, wherein, in the communication capability information of the terminal on the PC5 interface comprised in the first message, representation of a communication capability combination of the PC5 interface for an NR and NR dual connectivity is carried in third signaling.

14. The method according to claim 1, wherein, in the communication capability information of the terminal on the PC5 interface comprised in the first message, representation of a communication capability combination of the PC5 interface for an NR and NR dual connectivity is carried in fifth signaling.

15. The method according to claim 1, wherein the first signaling comprises at least one or more of:
   the communication capability information of the PC5 interface LTE-PC5 controlled by an LTE-Uu interface and with an access type of LTE;
   the communication capability information of the PC5 interface LTE-PC5 controlled by an NR-Uu interface and with the access type of the LTE; and
   the communication capability information of the PC5 interface NR-PC5 controlled by the LTE-Uu interface and with the access type of NR.

16. The method according to claim 1, wherein the second signaling comprises at least one or more of:
   the communication capability information of the PC5 interface NR-PC5 controlled by an NR-Uu interface and with an access type of NR;
   the communication capability information of the PC5 interface LTE-PC5 controlled by the NR-Uu interface and with the access type of LTE; and
   the communication capability information of the PC5 interface NR-PC5 controlled by an LTE-Uu interface and with the access type of the NR.

17. A terminal, comprising a first network interface, a first memory, and a first processor, wherein
   the first network interface is configured to send and receive a signal in an information receiving and sending process with other external network elements;
   the first memory is configured to store a computer program that can be run on the first processor; and
   the first processor is configured to implement a method for information transmission when running the computer program, wherein the method comprises:
   sending a first message to a network device, wherein the first message comprises communication capability information of the terminal on a PC5 interface,
   wherein in the communication capability information of the terminal on the PC5 interface comprised in the first message, representation of a communication capability of the PC5 interface for long term evolution LTE is carried in first signaling, and the representation of the communication capability of the PC5 interface for new radio NR is carried in second signaling.

18. A non-transitory computer-readable storage medium, storing a program for information transmission that, when being executed by at least one processor, implements a method for information transmission, wherein the method comprises:
   sending a first message to a network device, wherein the first message comprises communication capability information of the terminal on a PC5 interface,
   wherein in the communication capability information of the terminal on the PC5 interface comprised in the first message, representation of a communication capability of the PC5 interface for long term evolution LTE is carried in first signaling, and the representation of the communication capability of the PC5 interface for new radio NR is carried in second signaling.

* * * * *